United States Patent
Ravnkilde et al.

(10) Patent No.: US 7,227,677 B2
(45) Date of Patent: Jun. 5, 2007

(54) MICRO LIGHT MODULATOR ARRANGEMENT

(75) Inventors: Jan Tue Ravnkilde, Fløng (DK); Henning Henningsen, Låsby (DK)

(73) Assignee: DTCON A/S (DK)

( * ) Notice: Subject to any disclaimer, the term of this patent is extended or adjusted under 35 U.S.C. 154(b) by 0 days.

(21) Appl. No.: 10/509,148

(22) PCT Filed: Mar. 26, 2002

(86) PCT No.: PCT/DK02/00209

§ 371 (c)(1),
(2), (4) Date: Sep. 27, 2004

(87) PCT Pub. No.: WO03/081315

PCT Pub. Date: Oct. 2, 2003

(65) Prior Publication Data

US 2005/0157365 A1  Jul. 21, 2005

(51) Int. Cl.
*G02F 1/03* (2006.01)
(52) U.S. Cl. .................... 359/254; 359/245
(58) Field of Classification Search .............. 359/254, 359/223, 290, 291, 292, 295
See application file for complete search history.

(56) References Cited

U.S. PATENT DOCUMENTS

| 5,379,135 | A | * | 1/1995 | Nakagaki et al. ............. 349/9 |
| 5,835,256 | A | | 11/1998 | Huibers |
| 6,046,840 | A | | 4/2000 | Huibers |
| 6,671,078 | B2 | * | 12/2003 | Flanders et al. ............ 359/254 |
| 2001/0005239 | A1 | | 6/2001 | Ham |
| 2001/0043385 | A1 | | 11/2001 | Ham |

OTHER PUBLICATIONS

International Search Report; PCT/DK02/00209; Nov. 25, 2002.

* cited by examiner

*Primary Examiner*—Timothy Thompson
*Assistant Examiner*—Jerry Fang
(74) *Attorney, Agent, or Firm*—Cantor Colburn LLP (57) ABSTRACT

The invention relates to a micro light modulator arrangement (10) comprising at least one light transmission path (23) and at least one controllable shutter (11, 16) arranged for modulation of light transmitted via said at least one light transmission path (23), said at least a part of said light transmission path comprising a translucent solid material, and said at least a part of said light transmission path being an integral part of a substrate to which said at least one controllable shutter (11, 16) is anchored.

34 Claims, 7 Drawing Sheets

MICRO LIGHT MODULATOR ARRANGEMENT

FIELD OF THE INVENTION

The present invention relates to a micro light modulator arrangement as stated in the independent claim 1.

BACKGROUND OF THE INVENTION

Spatial light modulators (SLM) have a wide range of application areas. Examples are light modulation for dotwise exposure of photosensitive media, various displays, screens and signs and for routing light within the telecommunication industry. Very often, the light modulation is performed in systems which also make use of optical fibers or light guides.

The SLMs can be/have been optimized for the wave length range for which they are used. For instance, some systems exist which are optimized for UV-light while others are optimized for visible light.

Basically, there are two types of SLMs—reflective and transmissive modulators. Over the past year or so, a lot of work has been dedicated to designing and fabricating such SLMs using micro-opto-electro-mechanical systems (MOEMS) technology.

Reflective SLMs made in MOEMS technology are often based on arrays of tiny mirrors which can route and/or switch on and off the light by tilting the mirrors into well-defined positions. TI is leading in this area with their DLP-technology which has been—and is being—developed for high definition television (HDTV), digital projectors, home cinemas and a number of other applications. Today they hold a leading position as supplier of optical engines for digital projectors. However, other reflective technologies also exist such as the grating light valve (GLV) technology from Silicon Light Machines in California.

In the telecom industry, reflective systems are also the dominating technology, since this technology is used for routing optical signals between a large number of optical fibers/channels in optical cross fields. By using a reflective technology, such routing can be performed with minimal signal loss. Almost all major telecom suppliers are dedicating a lot of effort—internally or in cooperation with partners—to development and manufacture of such optical routers.

However, for a number of applications, the use of transmissive SLMs is superior compared to the use of reflective systems. There are applications in which a transmissive system for the same light source enables transmission of more light than a reflective system, and there are several applications in which the alignment and assembly of a transmissive system become easier by using a transmissive system instead of a reflective system.

A problem with the prior art MOEMS-based SLMs is that the manufacturing of the modulators involves extreme processes. This problem is especially significant when moving parts, e.g. shutter blades, are built on a wafer substrate.

Further significant problems related to the manufacturing of such SLMs are alignment of the optical system, sealing of the shutter arrangement, component costs, complexity and not to mention physical size.

The invention addresses these problems.

SUMMARY OF THE INVENTION

The invention relates to a micro light modulator arrangement (10) comprising at least one light transmission path (23) and at least one controllable shutter (11, 16) arranged for modulation of light transmitted via said at least one light transmission path (23), at least a part of said light transmission path comprising a translucent solid material and said at least a part of said light transmission path being an integral part of a substrate to which said at least one controllable shutter (11, 16) is anchored.

An arrangement of several modulators according to the invention may also be referred to as a spatial light modulator.

According to the invention, the transmission path through a substrate to which the shutters are anchored may advantageously progress in the material itself. Hence, instead of making holes or other types of transmission path cavities, the substrate itself may be applied for transmission of light through the modulator.

Typically, such a substrate comprises a wafer well-known within the art of micro-system terminology. In other words, a wafer is a slice of material serving as a basis for various micro-system components.

Therefore, hole etching may be completely or partly avoided according to the invention.

According to a preferred embodiment of the invention, the light transmission path forms an integral part of the substrate upon which the light modulator is anchored.

Several types of substrates, such as glass, fused silica, pyrex, etc. may be applied as a combined shutter support substrate and light transmission path.

A modulator according to the invention may typically be referred to as micro-opto-electro-mechanical system (MOEMS) technology within the art.

When said at least a part of said light transmission path comprises a part of a microlens arrangement (122), a further advantageous embodiment of the invention has been obtained.

According to a preferred embodiment of the invention, the modulator arrangement may be anchored directly on a microlens arrangement.

According to this preferred embodiment of the invention, a very compact micro light modulator arrangement may be obtained.

When said microlens arrangement (122) may be adapted for guiding incoming light through the light transmission path (23) to said at least one controllable shutter, a further advantageous embodiment of the invention has been obtained.

According to the invention, incoming light simply refers to light which has been emitted from a light-emitter and guided towards the shutter arrangement, i.e. unmodulated light. According to this embodiment of the invention, the microlens arrangement may thus be applied for injection of light into the micro-modulator system, typically towards the single modulator shutters.

According to a preferred embodiment of the invention, the microlens arrangement may e.g. be adapted for injection of light onto the controllable shutter by focussing, which reduces the optical loss on the input of the modulator.

When said microlens arrangement (122) may be adapted for guiding outgoing light via the light transmission path (23) from said at least one controllable shutter, a further advantageous embodiment of the invention has been obtained.

According to this embodiment of the invention, the outgoing light simply refers to modulated light which as been modulated by the modulator arrangement and then guided to some kind of modulated light receiving arrangement, e.g. a light-sensitive surface, another lens arrangement, a printing plate, a display, a number of centrally controlled fibers, etc.

In other words, outgoing light may be regarded as light which has been modulated by the modulator arrangement and now must be "injected" into a further system. This system may comprise a final illumination arrangement or some kind of light transmission or light adaptation arrangement.

According to a preferred embodiment of the invention, the microlens arrangement may e.g. be adapted for injection of light into fibers coupled thereto, focussing the modulated light on a light projection surface, etc.

When the extension of said at least a part of said light transmission path comprises a translucent shutter substrate of at least 100 micrometer, preferably at least 150 micrometer, a further advantageous embodiment of the invention has been obtained.

According to the invention, the extension of the translucent substrate forming the light transmission path should not go below 50 micrometer, preferably not below 100 micrometer, due to the fact that the substrate should also facilitate support for the shutters (modulator components).

When the extension of said at least a part of said light transmission path comprising a translucent shutter substrate is not in excess of 3000 micrometer, preferably not in excess of 2000 micrometer, a further advantageous embodiment of the invention has been obtained.

This maximum length is established partly due to the fact that a thickness in excess thereof is difficult to handle during manufacturing of the modulator and partly due to the fact that optical loss will typically increase in the transmission path if focussing optics are applied for guiding light into and via the optical path.

When the extension of said at least a part of said light transmission path comprises a translucent solid material of at least 200 micrometer, preferably at least 250 micrometer, a further advantageous embodiment of the invention has been obtained.

According to a further preferred embodiment of the invention, the transmission path, comprised of a translucent solid material, should at least be 50 to 200 micrometer due to the fact that a wafer forming the optical path is very difficult to control during manufacturing while still obtaining the desired optical transmission properties with respect to loss, focussing, etc. Moreover, the wafer may break during manufacturing.

When said one light transmission path (23) is a part of a substrate to which the at least one controllable shutter is (SB) anchored, a further advantageous embodiment of the invention has been obtained.

According to a further preferred embodiment of the invention, the transmission path forms part of the wafer on which e.g. the movable structures of the modulator is built.

According to this preferred embodiment of the invention, physical holes in the modulator substrate, also referred to as a shutter platform, may be avoided.

When said shutter is controlled by means of electrical activation means, a further advantageous embodiment of the invention has been obtained.

According to a preferred embodiment of the invention, the modulators may be activated by means of suitable electrical control signals, e.g. pulses, established by conventional RIP data processing techniques.

When said shutter comprises a mechanical blade which may be moved between at least two positions, and when said blade in one of said at least two positions is blocking for transmission of light via said at least a part of said light transmission path (23), a further advantageous embodiment of the invention has been obtained.

When said shutter blade performs a sliding movement with respect to the substrate forming said transmission path, a further advantageous embodiment of the invention has been obtained.

According to one embodiment of the invention, a sliding movement is preferred due to the fact that such shutter blade may be established in a relatively simple manner by means of existing MEMS processing techniques.

When said modulator comprises at least one microlens arrangement (122), a further advantageous embodiment of the invention has been obtained.

When said microlens arrangement forms a light input of said modulator, a further advantageous embodiment of the invention has been obtained.

When said modulator comprises light-emitting means arranged for transmission of light to the output of the modulator via said at lest one microlens arrangement and said at least one light transmission path, a further advantageous embodiment of the invention has been obtained.

When said light-emitting means comprises at least one UV light source, a further advantageous embodiment of the invention has been obtained.

It should be noted that visible light may also be applied according to the invention.

When said light-emitting means comprises at least one laser light-emitter, a further advantageous embodiment of the invention has been obtained.

When said shutter comprises at least one blade movable between at least two positions via at least one movement paths, said microshutter comprising electrode means for activation of a movement of said at least one blade between said at least two positions and for positioning the at least one blade in one of said at least two positions, said electrode means being arranged out of reach of the at least one blade in said at least two positions, a further advantageous embodiment of the invention has been obtained.

When said translucent light transmission path forms part of at least one microlens, a further advantageous embodiment of the invention has been obtained.

According to a preferred embodiment of the invention, microlenses are integrated in the modulator's light transmission path, thereby facilitating an extremely compact design.

When said light modulator is anchored on at least one translucent substrate and when said light modulator is arranged for modulation of light through said at least one translucent substrate via said at least a part of said light transmission path (23), a further advantageous embodiment of the invention has been obtained.

When said substrate forms said at least one light transmission path (23) which, in turn, forms at least one microlens, a further advantageous embodiment of the invention has been obtained.

When said at least one microlens is adapted for focusing light on said at least one micro-shutter, a further advantageous embodiment of the invention has been obtained.

When said micro light modulator comprises a further set of microlenses, a further advantageous embodiment of the invention has been obtained.

When said further set of microlenses is arranged as a separate layer, a further advantageous embodiment of the invention has been obtained.

When said translucent solid material comprises fused silica, a further advantageous embodiment of the invention has been obtained.

Fused silica, which may also be referred to as quartz, benefits from very limited damping when light is transmitted via the substrate, even at ultra violet (=UV) wavelengths.

When said translucent solid material comprises glass, e.g. pyrex, a further advantageous embodiment of the invention has been obtained.

Pyrex or pyrex-like glass benefits from very limited damping of light, especially with respect to light having wavelengths above UV-light.

According to a preferred embodiment of the invention, borofloat substrates are used as glass substrates.

Pyrex or pyrex-like glass moreover facilitates anodic bonding when combining for example Si-shutter and glass substrate.

Furthermore, some methods of manufacturing of microlenses requires glass having a low glass transition temperature.

Other types of glass substrates may be applied according to the invention.

When said translucent solid material comprises polymers, a further advantageous embodiment of the invention has been obtained.

According to the invention, polymers such as PMMA (PMMA=PolyMethylMetAcrylate), PC (PC=Polycarbonate), Epon SU-8 (Epoxy-based photoresist), etc. may be applied as a translucent shutter support substrate.

PMMA and PC are relatively inexpensive and very suitable for replication processes by means of mechanical punching or hot embossing, injection moulding, stamping or the like.

Epon SU-8 benefits from a high refraction index and is therefore very suitable for microlenses.

When said micro light modulator arrangement comprises at least one blade (16) movable between at least two positions via at least two movement paths (MP), and electrode means (12, 13) for activating movement of said at least one blade (16) between said at least two positions and for positioning the at least one blade (16) in one of said at least two positions, said electrode means (12, 13) being arranged out of reach of the at least one blade (16) when the blade moves along said at least one movement path (MP), a further advantageous embodiment of the invention has been obtained.

According to this "contactless" preferred embodiment of the invention, sticking to the electrodes or blocks may be avoided.

When said connection portion comprises at least one beam (11)

wherein said at least one blade is established on a microshutter platform (MSP) comprising a translucent substrate, such as a glass wafer, a further advantageous embodiment of the invention has been obtained.

When said at least two positions comprise at least one position in which the at least one blade (16) defines a blocking of at least one electromagnetic light transmission path (TP), a further advantageous embodiment of the invention has been obtained.

When said shutter blade (SB) is anchored on a (micro) shutter platform (MSP) by a anchoring means (15), said at least one transmission path (TP) extending through the micro shutter platform (MSP) via said solid translucent transmission path (23), and said at least one transmission path guiding electromagnetic light through the shutter platform being at least partly defined by means of a masking, a further advantageous embodiment of the invention has been obtained.

According to a preferred embodiment of the invention, the micro light modulator arrangement comprises a plurality of light modulators, and very high density of modulators may be obtained.

Moreover, the invention relates to a sealing arrangement comprising a micro light modulator according to any of the claims, said sealing comprising said at least a part of said light transmission path.

An important advantage of a sealing according to the invention is that the shutter mechanics, e.g. the moving beam and shutter parts, e.g. the shutter blade, may be completely or partly encapsulated by the light transmission path forming a translucent substrate.

The sealing may protect the moving parts against for example particles, humidity and impurities.

When said sealing further comprises at least one microlens arrangement (121), a compact and advantageous embodiment of the invention has been obtained.

According to the invention, integrated microlenses may advantageously form a sealing or part of a sealing.

When said sealing encompasses said at least one controllable shutter (11, 16) an advantageous embodiment of the invention has been obtained.

According to a preferred embodiment of the invention, the primary components of the sealing may form a microlens arrangement and the light transmission path a translucent substrate.

THE FIGURES

The invention will be described in the following with reference to the drawings, where FIG. 1 and FIGS. 3–6, FIGS. 3 to 6 illustrate various embodiments of the invention.

DETAILED DESCRIPTION

Figure 1A:
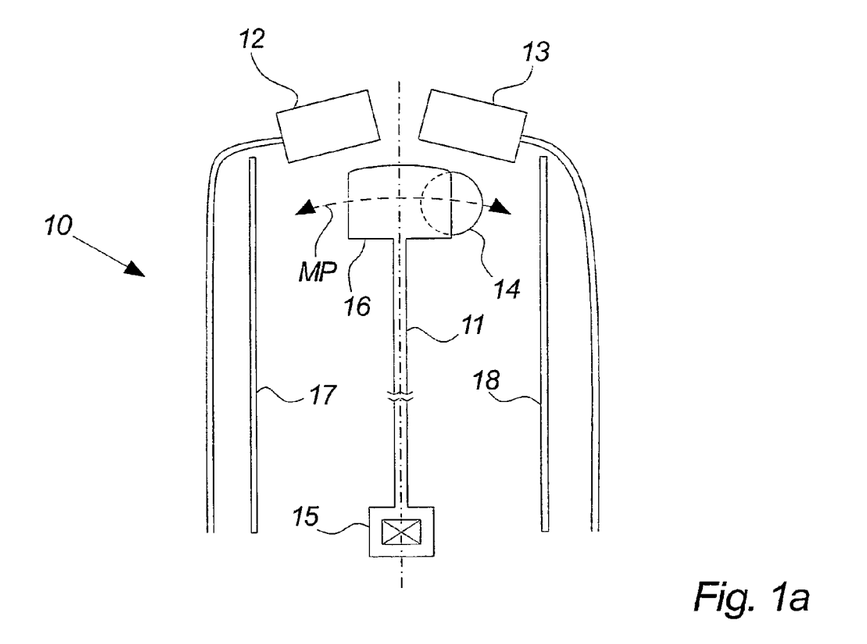
FIG. 1a illustrates a micro-mechanical contactless shutter according to the invention

FIG. 1a illustrates a micro shutter according to the invention.

The illustrated shutter comprises a number of shutter components anchored to a translucent shutter platform, e.g. a wafer.

A transmission path 23 (see FIG. 2a) for guiding electromagnetic light through the shutter wafer is defined by a transmission path established by a hole 14 in the masking of the translucent shutter platform. The electromagnetic light may also include invisible light, e.g. heat-wave beams or UV-light.

A conventional hole through the platform may thus be avoided.

The illustrated main component comprises electrodes 12, 13, both fastened to the shutter platform.

A shutter beam 11 is anchored to the platform at a fastening point 15 at the one end and a fitted with a shutter blade 16 at the other end. The shutter blade may be moved relatively to the light transmission path defined by the hole masking 14 by activation of the individually controllable electrodes 12, 13.

The illustrated shutter blade 16 is electrically connected to a feeding line via the anchoring 15.

Details about different shutter blade 16 designs will be discussed with reference to FIGS. 8a to 8d.

The moving parts of the shutter, e.g. the blade, are electromagnetically shielded from the feeding lines to electrodes by connecting the shielding 17, 18 to the electrical potential of the moving parts.

Figure 1B:
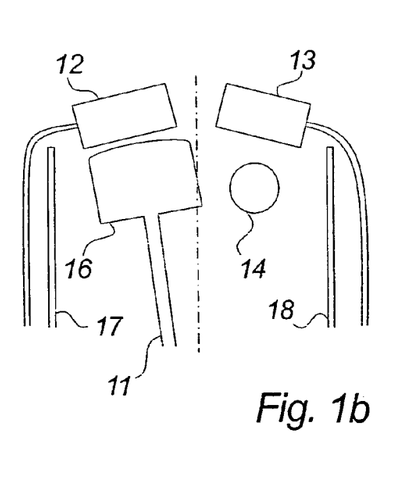
FIGS. 1b and 1c illustrate the dynamic properties of the (micro) mechanical shutter of FIG. 1a when moving the blade.
Figure 1C:
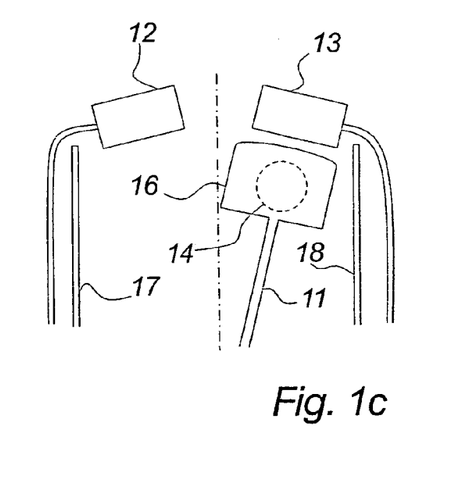

FIGS. 1b and 1c illustrate the fundamental dynamic properties of the shutter of FIG. 1a.

In FIG. 1b, the electrode 12 is activated and the shutter blade 16 is moved to the left, thereby leaving the light transmission path defined by the masking hole 14 open.

The static position of the shutter blade 16 is defined by the electrode 12.

Note that the left shielding 17 prevents the shutter blade 16 from being pulled by electromagnetic forces established between the shutter blade and the feeding line of the-electrodes 12 once the electrodes are activated.

In FIG. 1c, the electrode 13 is activated and the shutter blade 16 is moved to the right, thereby blocking the light transmission path defined by the masking hole 14.

The static position of the shutter blade 16 is defined by the electrode 13.

Note that the right shielding 18 prevents the shutter blade 16 from being pulled by electromagnetic forces established between the shutter blade 16 and the feeding line of the electrode 13 once the electrodes are activated.

The illustrated shutter may be modulated by appropriate electrical activation of the electrodes 12 and 13.

Note, that the path in which the shutter blade 16 moves is defined by the beam 11 and the fastening point 15.

Moreover, it should be noted that electrodes are out of reach with respect to the shutter blade in the two positions (on-off) illustrated in FIG. 1b and FIG. 1c, thereby avoiding sticking or short-circuiting between the fixed electrodes and the moving shutter blade 16.

Hence, mechanical stoppers etc. may basically be avoided in the design with the purpose of maintaining the shutter blade in the shutter main on-off positions.

In some designs failing within the scope of the invention, however, stoppers may be appropriate in order to keep the shutter blade from moving further than intended under particular circumstances, i.e. the shutter blade passes the position intentionally defined by the electrodes 12, 13 and the shutter blade 16.

Hence, during normal use, no contact is established between the moving shutter blade 16, the beam 11 and the fixed electrodes or mechanical stoppers.

Figure 3:
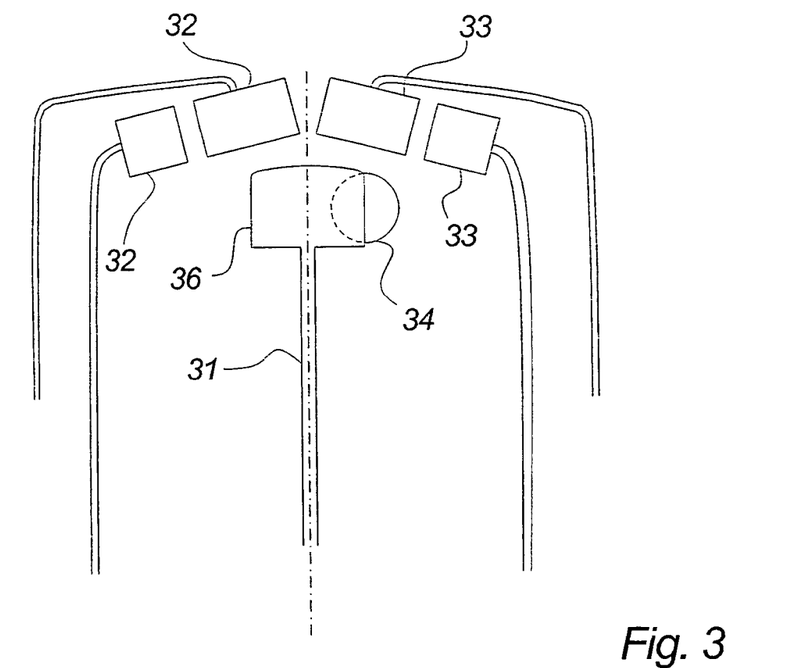

FIG. 3 illustrates a further embodiment of the invention.

The basic components are the same as the components of FIG. 1a but the individual electrodes 12, 13 has now been replaced by an electrode set 32 (two) and an electrode set 33 (two).

Hence, according to the illustrated embodiment, the movement of the shutter blade 36 may be controlled more efficiently (e.g.: acceleration of the blade 36 is controlled by applying suitable control signals to the electrodes) and the "static" positions are now at least four (again: suitable control signals are applied to the electrodes).

Figure 4:
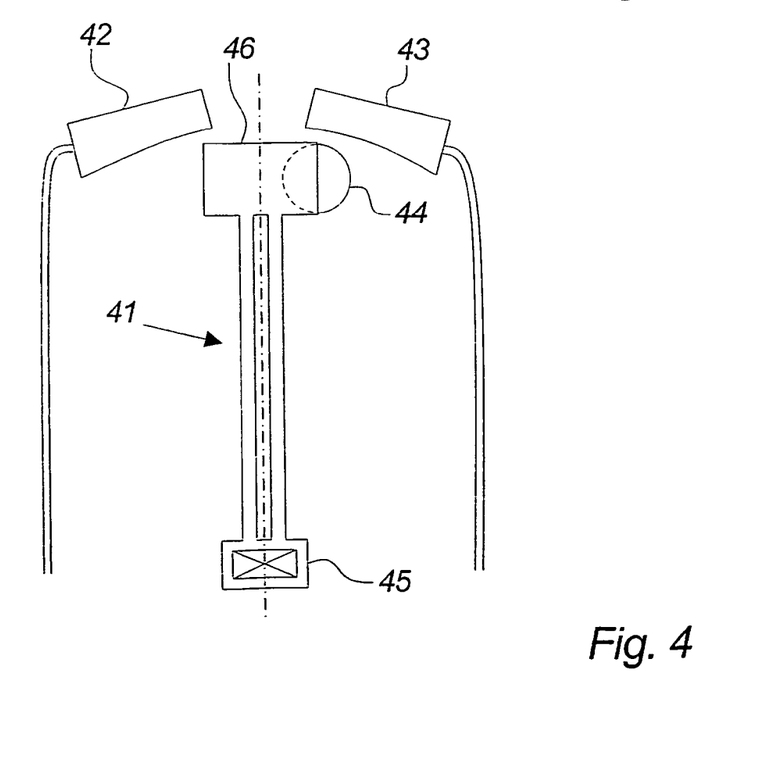

FIG. 4 illustrates a further embodiment of the invention.

The basic components are the same as the components of FIG. 1a but the single beam 11 has now been replaced by a beam structure 41 comprising two beams.

The double beam structure may be applied for controlling the movement modes of the beam.

Figure 5:
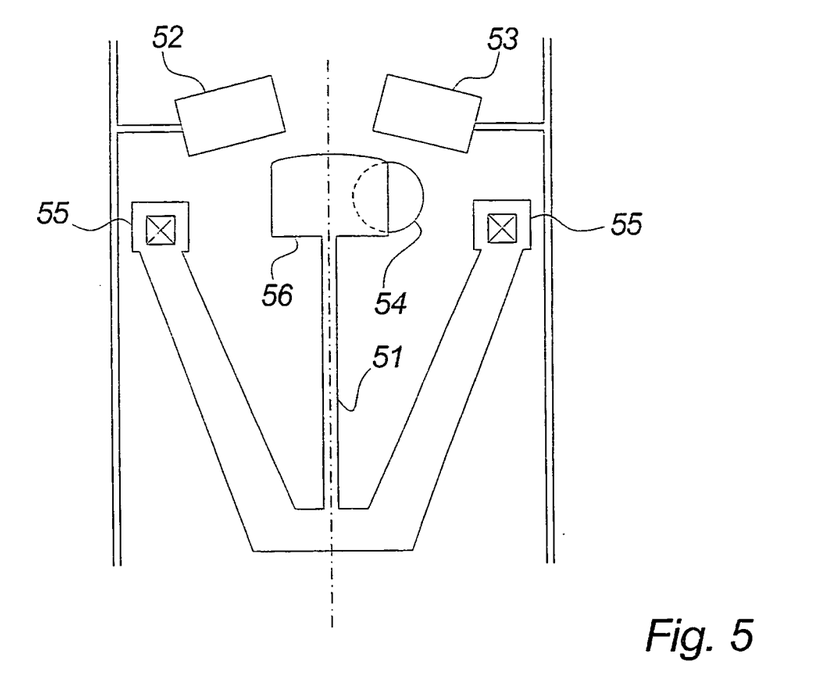

FIG. 5 illustrates a farther embodiment of the invention.

The basic components are the same as the components of FIG. 1a but now they feature two anchoring points 55.

Hence, the complete area of the shutter structure may be reduced significantly.

Other advantages may be introduced such as compensation for thermal expansion of the beam, which may (when uncompensated) lead to shorts-circuits between the blade 56 and the electrodes 52, 53.

Figure 6:
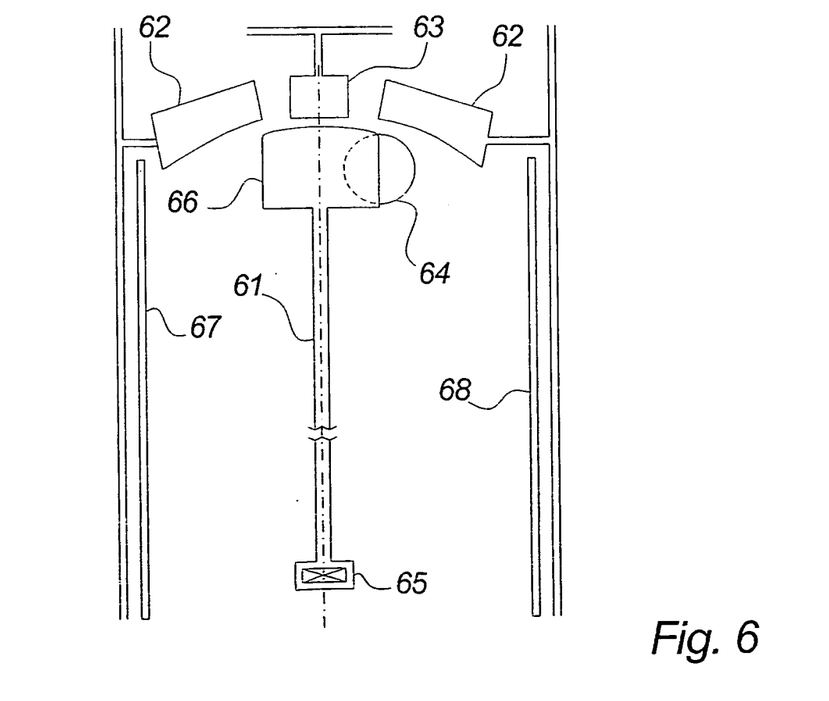
Figure 7:
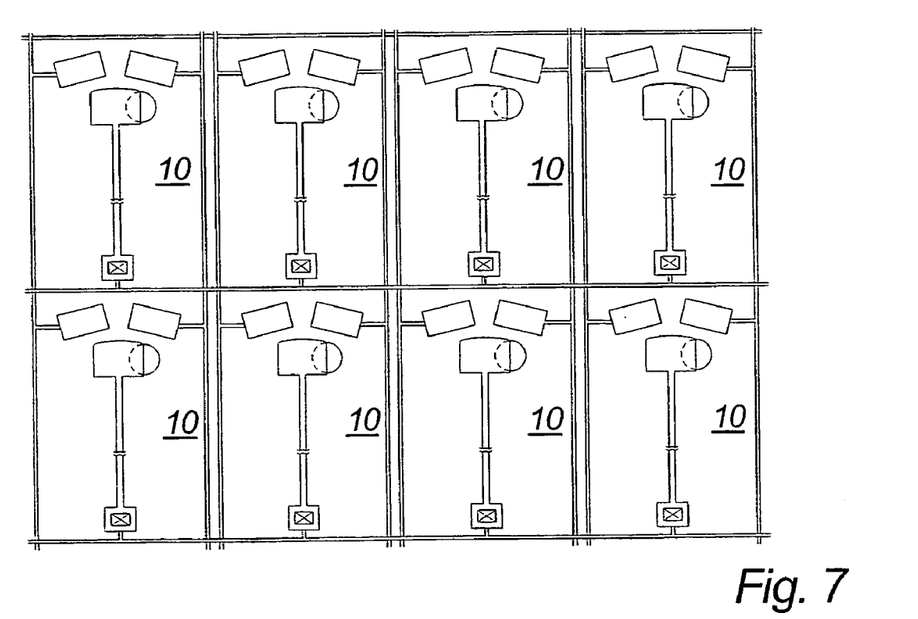
FIG. 7 illustrates a shutter array according to the invention.
Figure 8A:
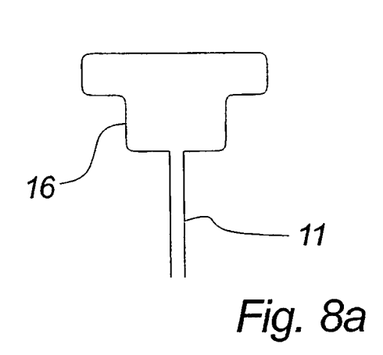
FIGS. 8a to 8d illustrate various shutter blade forms within the scope of the invention.
Figure 8B:
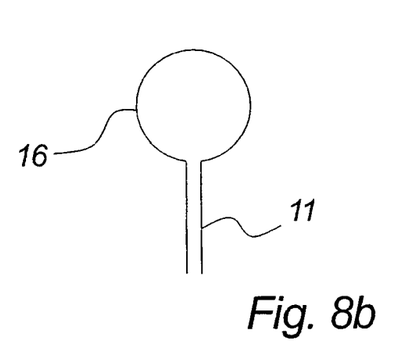
Figure 8C:
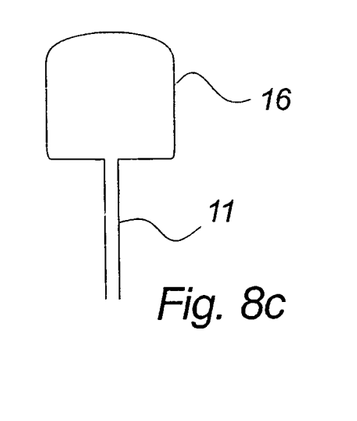
Figure 8D:
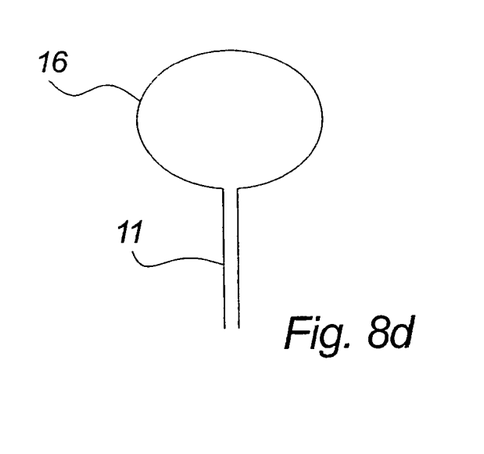

FIG. 6 illustrates a further embodiment of the invention.

The illustrated shutter comprises a number of shutter components anchored to a shutter platform, e.g. a wafer.

An electromagnetic light transmission path through the shutter is defined by a hole 64. The electromagnetic light may also include invisible light, e.g. infrared light, etc.

The illustrated main component comprises electrodes 62, 63, both fastened to the shutter platform.

A shutter beam 61 is anchored to the platform at a fastening point 65 at the one end and a fitted with a shutter blade 66 at the other end. The shutter blade may be moved relatively to the light transmission path defined by the hole 64 by activation of the individually controllable electrodes 62, 63.

Details about different applicable shutter blade 66 designs will be discussed with reference to FIGS. 8a to 8d.

The moving parts of the shutter, e.g. the blade, are electromagnetically shielded by a shielding 67, 68 with respect to the feeding lines of the electrodes 62, 63.

FIGS. 1b and 1c illustrate the fundamental dynamic properties of the shutter blade 66. However, significant differences between the electrode structure and the activation of the electrodes of the shutter of FIG. 1a and FIG. 6 are observed.

The static positions of the shutter blade 66 are still defined by the electrodes 62, 63, but the transition between the two end positions are now controlled by means of three electrodes 62, 63.

Basically, the center electrode 63 may be applied for initiating transition from an on-position to an off-position and vice versa.

It should be noted that this three-electrode structure facilitates control of the electrodes 62 by one and the same driver. The same electrode driver may also be utilized to control all electrodes of an entire shutter array (e.g. an array with a structure like the one illustrated in FIG. 6).

Note that the shielding 67, 68 prevents the shutter blade 66 beam from being pulled by electromagnetic forces established between the shutter blade and the feeding lines of the electrodes 62 once they are activated.

It should be noted that the main electrodes of the above-described shutters of FIGS. 1a–1c and FIG. 3 to FIG. 6 are out of reach with respect to the shutter blade in all intended positions, e.g. on-off positions illustrated in FIG. 1b and FIG. 1c, thereby avoiding short-circuiting and sticking between the fixed electrodes and the moving shutter blade.

Hence, mechanical stoppers etc. may basically be avoided in the design with the purpose of maintaining the shutter blade in the shutter main on-off positions.

In some designs falling within the scope of the invention, however stoppers may be appropriate in order to keep the shutter blade from moving further than intended under particular circumstances, i.e. the shutter blade passes the position intentionally defined by the electrodes and the shutter blade.

Hence, during normal use, no contact is established between the moving shutter blade/beam structure and the fixed electrodes or mechanical stoppers.

FIGS. 8a to 8d illustrate different shutter blade 16 designs within the scope of the invention.

It should be noted that the "corners" of the shutter blade 16 in a preferred embodiment of the invention should be curved/rounded in order to minimize the size and weight of the blade.

An optimal blade design with respect to weight/form facilitates quicker and easier acceleration of the blade once activated by the associated electrodes.

Still, it should be noted that the blade should be able to cover/block an associated translucent transmission path which is not necessarily circular according to the invention.

In other words, according to the invention, the light transmission path in the shutter substrate may have a non-circular cross-section, if so desired.

Figure 2A:
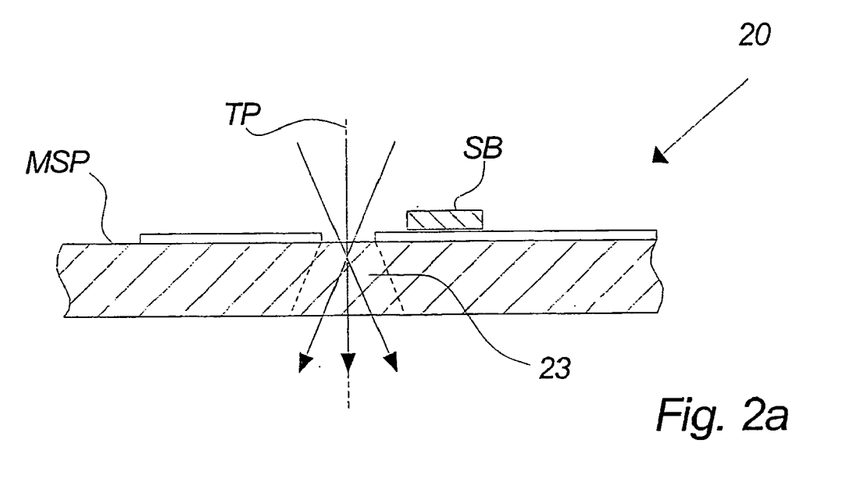
FIGS. 2a to 2c illustrate the properties of the different cross-sections of the individual transmission paths of the individual modulators as illustrated in e.g.
Figure 2B:
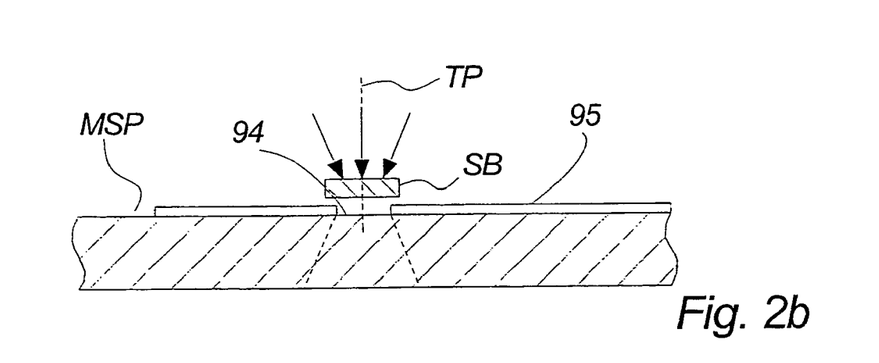
Figure 2C:
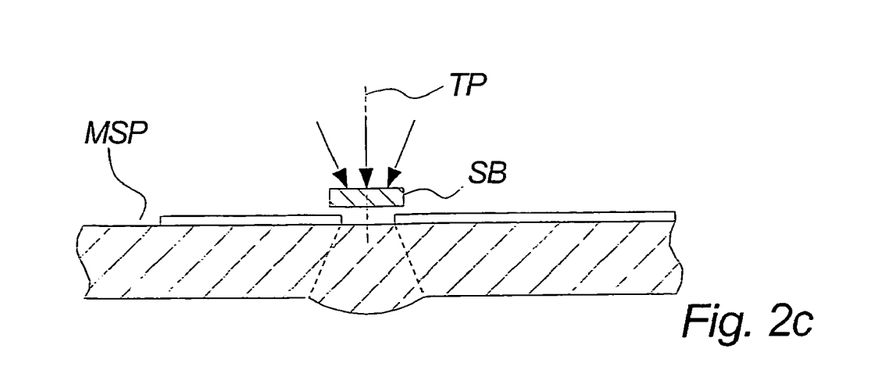

FIGS. 2a to 2c illustrate the properties of the different cross-sections of the individual transmission paths of the individual modulators as illustrated in FIG. 1 and FIG. 3 to FIG. 6 according to the illustrated embodiment of the invention.

FIGS. 2a to 2c illustrate a feature of different applicable transmission paths TP defined e.g. by the masking holes 14, 34, 44, 54, 64 of the shutter arrangements of FIG. 1 and FIGS. 3 to 7.

It should be noted that the illustrated masking holes 14, 34, 44, 54, 64 defining the translucent transmission path through the modulator platform may have any suitable form other than the illustrated circular cross-sections.

The hole 94 (corresponding to the holes 14, 34, 44, 54, 64) is established as a hole in a non-translucent masking layer 95 arranged on top of the miscroshutter platform MSP.

The illustrated transmission path TP represents a preferred embodiment of the invention.

The illustrated transmission path is partly defined by one of the above-mentioned masking holes and the light may be blocked and non-blocked by means of a blade SB, (e.g. one of the previously described blades 16, 36, 46, 56, 66).

Light may be transmitted through the translucent shutter platform.

The effective length of the transmission path TP of the illustrated embodiment referred to in the claims as "the at least a part of said light transmission path comprising a translucent solid material" is defined as the thickness of the modulator platform MSP in FIG. 2a and FIG. 2b. The length of the transmission path in FIG. 2c is defined as the thickness of the modulator platform MSP plus the effective length of the illustrated convex lens forming part of the translucent solid transmission path.

The transmission path is preferably conical with the narrow part of the hole nearest to the shutter blade SB.

It should be noted that the masking may optionally be located on the input and/or output face of the modulator platform.

Moreover, FIG. 2c illustrates an embodiment of the invention in which the optical transmission path through the modulator forms a microlens on the output face, thereby facilitating transmission of light through the modulator which may be focussed suitably on the output of the shutter, e.g. into a fiber or directly on an illumination surface.

Figure 9A:
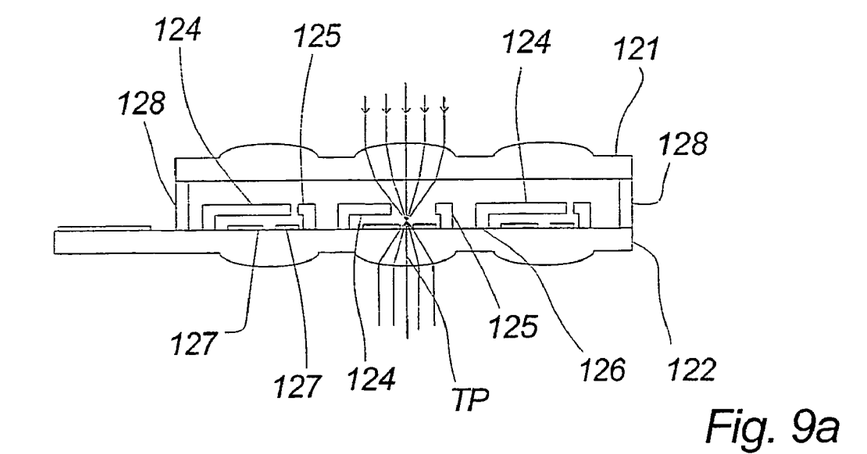
FIGS. 9a to 9c illustrate different compact embodiments of the invention.
Figure 9B:
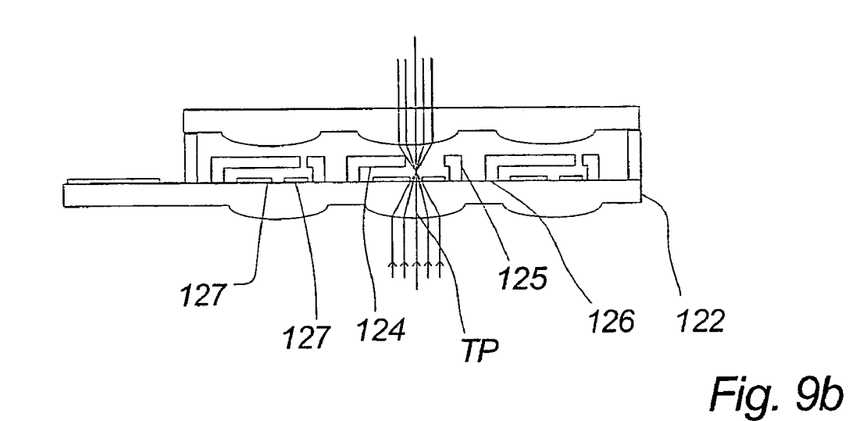
Figure 9C:
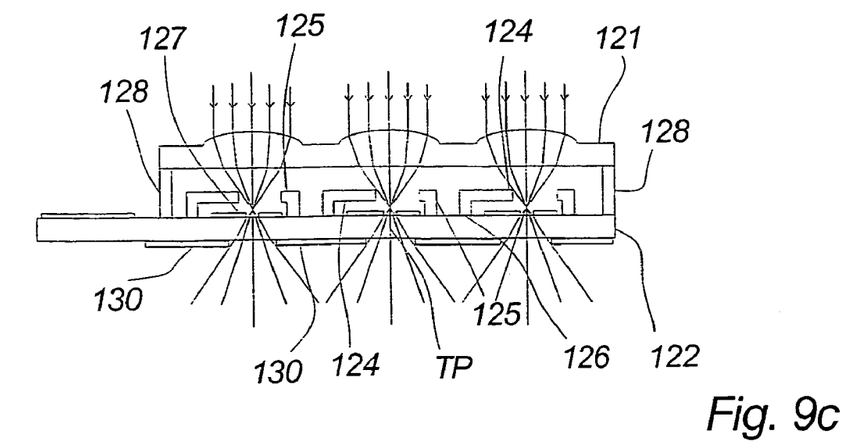

It should be noted that the above-illustrated embodiments of transmission paths TP may moreover be supplemented with further input/output optics, e.g. the illustrated embodiments in FIG. 9a to FIG. 9c.

FIG. 9a to FIG. 9c illustrate different compact embodiments of the invention.

The illustrated embodiments, here illustrated by a cross-section, may e.g. be combined with the designs of FIG. 1 and FIGS. 3–6.

FIG. 9a illustrate a further and preferred embodiment of the invention.

The MOEMS device comprises a microlens arrangement 122 upon which a number of shutter blades 124; 16 are anchored in fastenings 126; 15. The shutter blades 124 interact with electrodes 125 also anchored on the microlens arrangement 122.

Masking 127 partly defines the light transmission path through the microlens arrangement 122 together with a farther microlens arrangement 121. The microlens arrangement 121 is attached to the microlens arrangement 122 by means of spacers 128.

The microlens arrangement 122 in FIG. 9a is adapted to focussing outgoing light on for example an illumination surface.

The illustrated spacers 128 may e.g. have an effective length of 50 micrometers, but they may typically be between 10 to 100 micrometers according to a preferred embodiment of the invention. However, it should be noted that other dimensions may be applicable as well when taking into consideration the fact that the spacers should be carefully dimensioned when considering e.g. the properties of the modulator and the related optics.

FIG. 9b illustrates a further variant of the above illustrated system.

In this embodiment, light is transmitted via the shutter from below via the light transmission path TP.

In this embodiment, a microlens arrangement 122 is adapted to focussing incoming light through the shutter masking 127, and the microlens arrangement 121 is adapted to guiding light to for example an illumination surface. Hence, the microlens arrangement 122 may be regarded as input-optics, and the microlens arrangement 121 may be regarded as output-optics.

In a further embodiment of the invention illustrated in FIG. 9c.

According to the illustrated embodiment, a masking 127 is arranged on the input of the light transmission path TP on the microlenses 122.

Moreover, this masking is supplemented by a masking 130 on the opposite side of the shutter platform 122.

In this embodiment, a microlens arrangement 121 is adapted to focussing incoming light through the shutter maskings 127 and 130.

It may be appreciated by the description above of the compact system that the configuration of the masking on the platform or the optics may be applied in several different ways within the scope of the invention.

A further advantage of the above-illustrated design is that the shutter mechanics, e.g. the moving beam and shutter blade 124, may be completely encapsulated by the two microlens arrangements 121 and 122 and e.g. spacers and/or edge sealing, thereby protecting the moving parts against particles, humidity and impurities.

Moreover, it should be emphasized that the illustrated modulator arrangement may comprise further layers of optics, such as microlenses, both on the light input and the light output.

Thus, when building on a translucent material, it may be advantageous to have a dimming mask on the side of the substrate which is opposite the shutter (shown on drawing), for example. The purpose is to avoid or reduce straylight or other undesired light. The holes in such a mask should be aligned concentricly with the corresponding holes at the shutter side to reduce loss of light.

Evidently, such masking may be applied both on the "shutter-side" of the platform as well as on the opposite side of the platform or in combination. Moreover, such masking may be applied together with the optics of the modulator, e.g. the injection optics. However, it should be emphasized that the masking, the optics and the modulator itself must be regarded as a system in which the components must be mutually calibrated in this aspect.

Addressing electronics may be integrated on the substrate such as memory cells, transistors or the like—a man skilled within the art would know.

Moreover, the illustrated embodiment in FIGS. 9a to 9c illustrates that the modulator substrate 122 may form part of a sealing encapsulating sensitive modulator parts.

An important advantage of a sealing according to the invention is that the shutter mechanics, e.g. the moving beam 124 and shutter parts, e.g. the shutter blade, may be completely or partly encapsulated by the light transmission path forming a translucent substrate.

The sealing may protect the moving parts against for example particles, humidity and impurities.

When said sealing further comprises at least one microlens arrangement 121, a compact and advantageous embodiment of the invention has been obtained.

According to the invention, integrated microlenses may advantageously form a sealing or a part of a sealing as illustrated in FIGS. 9a to 9c. Evidently, several other sealing configurations than those illustrated may be established according to the invention.

When said sealing encompasses said at least one controllable shutter (11, 16) an advantageous embodiment of the invention has been obtained.

According to a preferred embodiment of the invention, the primary components of the sealing may form a microlens arrangement and the light transmission path a translucent substrate.

Various comments and characteristics of the shutter designs described above in FIG. 1a to 9 are given below.

The shutters may be built on various substrates. Examples are glass wafers.

By means of glass wafers—or other translucent substrates—light can be transmitted without making a hole under the shutter blade (the hole is completely or partly uncovered when light is to be transmitted).

Note that construction of a light modulator on a translucent substrate such as a glass wafer is not limited to contactless shutters!

According to the invention, a blade is basically a blocking device which may facilitate control of incoming light, e.g. simply by blocking the incoming light or by guiding the incoming light in a "dimming" direction.

When building on a translucent material, it may be advantageous to have a dimming mask on the side of the substrate which is for example opposite the shutter (shown on drawing). The purpose is to avoid or reduce straylight or other undesired light. The holes in such a mask should be aligned concentricly with the corresponding holes at the shutter side to reduce loss of light.

Evidently, such masking may be applied both on the "shutter-side" of the platform and on the opposite side of the platform or in combination. Moreover, such masking may be applied together with optics of the modulator, e.g. the injection optics. However, it should be emphasized that the masking, the optics and the modulator itself must be regarded as a system in which the components must be mutually calibrated in this aspect.

The shutter itself, with corresponding wires etc. for addressing, comprises one building brick—a unit. Several units may be arranged to form shutter arrays in various patterns and optimized for various applications.

Addressing of shutters in arrays may take place according to the current column-line-addressing scheme, or by using individual addressing like TI or a third method. The technological possibilities will also depend on the voltage levels required.

Various materials may be used for building the parts—for instance polysilicon, monocrystalline silicon or nickel. The material will depend also on the application and the current design. Nickel, for instance, is a conducting metal by means of which charges can be conducted away which reduces the risk of trapped charges in cases in which that is an advantage. Nickel can be deposited at low temperatures which makes it possible to build nickel shutters on substrates comprising transistors. Polysilicon is a semiconductor which carries the risk of trapped charges build-up. However, it has a thermal expansion coefficient which is close the coefficient of glass and should be used when that is an advantage. Silicon is a perfect elastic material which does not suffers from fatigue and creep (as metals do).

Ideally, for the contactless design with electrodes positioned above the shutter blade, the moving shutter should be built in a material which has a thermal expansion coefficient close to the coefficient of the substrate. This is due to the fact that in closed position when the light is blocked, the shutter absorbs the heat from the incident light. Due to the temperature gradient, the shutter will expand, and in the worst-case scenario, close the gap to the electrodes and cause a short circuit. The better the heat is conducted away, i.e. the better the heat conductivity of the material used, the smaller the risk of this happening. Furthermore, the shutter may be coated by a reflecting material which will also reduce the amount of heat absorbed.

The shutter arm, in neutral/not activated position, should be positioned symmetrically with any conducting lines (wires) on the substrate. If not, there is a risk that the electrostatic field created between the shutter and the conducting line/wire will be stronger to one side and tend to draw the shutter to that side—which again results in an increased risk of short circuit if the shutter is drawn too much to one side and touches the line/wire. This effect may be counteracted or removed by building an electrostatic shield on both sides of the moving shutter part.

A drawback resulting from not having stoppers in the outer positions is that the shutter vibrates in the outer positions. However, this vibration may be minimized by properly optimized addressing pulses and properly designed addressing electrodes.

It is expected that the shutter must be mounted in a sealed housing in order to avoid dust particles and other polluting sources. The surface of the housing on both sides of the shutter should be made of translucent material to enable transmission of light when the shutter is open.

The detailed shutter design may be made more compact by folding the beam(s) holding the shutter blade, see e.g. FIG. 5.

It is important that both the shape of the shutter blade and the electrodes and the distance between them is optimized in such a way that the risk of contact—and thereby short circuit—during movement is minimized. This includes taking into account the various vibration modes which may occur during movement.

It should be noted that electromagnetic light includes all types of light, e.g. including infrared light and UV light.

It should be noted that the claimed invention deals with operational conditions. Hence, a "contactless design" refers to operational conditions, e.g. with respect to temperature, movement modes, etc.

By moving a shutter blade horizontally above a substrate, and thereby opening and closing a masking hole located beneath the blade, it is possible to control transmission of light through the hole. The blade is suspended above the substrate in a flexible suspension containing one or more beams. Displacement of the blade is achieved by electrostatic actuation by means of one or more drive electrodes.

In order to avoid in-use stiction, no contact between the moving and static parts occurs during operation of the device. This is achieved by providing the moving parts and the drive electrodes with a particular shape and location.

Several variations of the design exist which all rely on saturation of the electrostatic force at the opened and closed positions of the shutter.

The modulator arrangement may be applied in several different applications of modulators, such as the modulators illustrated in FIGS. 1–6.

Materials

Examples of materials which may be applied to the above-described shutters FIG. 1 to FIG. 6 are mentioned below. Evidently, other materials may be applied within the scope of the invention.

Substrates

Buildings with opaque structures, e.g. silicon on translucent substrates (e.g. various types of glass such as pyrex).
  Advantage of Glass Substrates:
    No etching of through-holes needed
    On-chip lenses made in the glass substrate
    Low thermal expansion coefficient Building Materials for Blade/Beam and Electrodes
  Some characteristics of different building materials have been stated below:

Silicon as Building Material:
  Si is a perfect elastic material without fatigue and creep
  Low thermal expansion coefficient and good matching to Si or glass substrates
  Difficult to control internal stress
  Difficult to integrate silicon shutter on CMOS electronics chips due to the high processing temperatures needed for the silicon deposit and annealing.

Nickel as Building Material:
  Ni is a metal and suffers from fatigue and creep if operated in the wrong way
  High thermal expansion coefficient and bad matching to Si or glass substrates
  Easy to deposit thick layer
  Easy to control internal stress
  Possible to integrate nickel shutters on CMOS electronics chips due to the low process temperatures needed for nickel deposit.

The Nickel-Iron Alloy "Invar" as Building Material:
  Metal. Suffers from fatigue and creep if operated in the wrong way
  LOW thermal expansion coefficient and good matching to Si or glass substrates
  Easy to deposit thick layer
  Difficult to control internal stress
  Possible to integrate nickel shutters on CMOS electronics chips due to the low process temperatures needed for nickel deposit
  Deposit methods still under investigation.

Some Comments as to Why it is an Advantage to Build Thicker Layers:

The out-of-plane stiffness of the beam can be increased by increasing the building height. Stiffness goes with the thickness to the third. An increased out-of-plane stiffness of the beam will make release of the structures easier, since the structures are less fragile and since the long beams will not stick as easily to the substrate. Also, during operation, the shutter will be more robust in terms of out-of-plane movement. The increased building height does not change the needed actuation voltage for in-plane movements. The in-plane beam stiffness increases proportionally with the height of the beam. However, the actuation force also increases proportionally with the height of the front edge of the blade and the electrode height. Thus, it is balanced out.

The increased building height does not change the resonance frequency and thus the travel time of the blade. This is due to the fact that the stiffness of the beam changes with the same ratio as the effective mass of the system.

The invention claimed is:

1. Micro light modulator arrangement comprising:
   at least one light transmission path and at least one controllable shutter arranged for modulation of light transmitted via said at least one light transmission path;
   at least a part of said light transmission path comprising a translucent modulator substrate;
   said at least part of said light transmission path being an integral part of a substrate to which said at least one controllable shutter is anchored;
   at least one blade movable between at least two positions via at least one movement path, wherein said blade is anchored on a micro shutter platform by anchoring means;
   said at least one transmission path (TP) extending through said micro shutter platform via a solid translucent transmission path; and
   said at least one transmission path guiding electromagnetic light through said shutter platform which is at least partly defined by means of a masking.

2. Micro light modulator arrangement according to claim 1, wherein said at least part of said light transmission path comprises a part of a microlens arrangement.

3. Micro light modulator arrangement according to claim 2, wherein said microlens arrangement may be adapted for guiding incoming light through the light transmission path to at least one controllable shutter.

4. Micro light modulator arrangement according to claim 2, wherein said microlens arrangement may be adapted for guiding outgoing light through the light transmission path from said at least one controllable shutter.

5. Micro light modulator arrangement according to claim 1, wherein an extension of said light transmission path comprises a translucent modulator substrate of at least 100 micrometer, preferably at least 150 micrometer.

6. Micro light modulator arrangement according to claim 5, wherein the extension of said light transmission path comprises a translucent modulator substrate not in excess of 3000 micrometer, preferably not in excess of 2000 micrometer.

7. Micro light modulator arrangement according to claim 1, the extension of said at least part of said light transmission path comprising a translucent modulator substrate of at least 200 micrometer, preferably at least 250 micrometer.

8. Micro light modulator arrangement according to claim 1, wherein said one light transmission path is a part of a substrate to which the at least one controllable shutter is anchored.

9. Micro light modulator arrangement according to claim 1, said shutter being controlled by electrical activation means.

10. Micro light modulator arrangement according to claim 1, said shutter comprising a mechanical blade which may be moved between at least two positions, and said blade in one of said at least two positions blocking transmission of light via said at least a part of said light transmission path.

11. Micro light modulator arrangement according to claim 10, said shutter blade performing a sliding movement with respect the substrate forming said transmission path.

12. Micro light modulator arrangement according to claim 1, said modulator comprising at least one microlens arrangement.

13. Micro light modulator arrangement according to claim 2, said microlens arrangement forming a light input of said modulator.

14. Micro light modulator arrangement according to claim 1, said modulator arrangement comprising light-emitting means arranged for transmission of light to an output of the modulator via at least one microlens arrangement and said at least one light transmission path.

15. Micro light modulator arrangement according to claim 14, wherein said light-emitting means comprises at least one UV light source.

16. Micro light modulator arrangement according to claim 14, wherein said light-emitting means comprises at least one laser light emitter.

17. Micro light modulator arrangement according to claim 1, comprising at least one blade movable between at least two positions via at least one movement path;
a microshutter comprising electrode means for activating movement of said at least one blade between said at least two positions and for positioning the at least one blade in one of said at least two positions; and
said electrode means being arranged out of reach of the at least one blade and a beam in one of said at least two positions.

18. Micro light modulator arrangement according to claim 1, wherein a translucent light transmission path comprises a part of at least one microlens.

19. Micro light modulator arrangement according to claim 1, wherein said light modulator is located on said at least one translucent substrate and said light modulator is arranged for modulation of light through said at least one translucent substrate via said at least a part of said light transmission path.

20. Micro light modulator arrangement according to claim 19, wherein said substrate, forming said at least one light transmission path, forms at least one microlens.

21. Micro light modulator arrangement according to claim 1, wherein at least one microlens is adapted to focusing light on at least one micro-shutter.

22. Micro light modulator arrangement according to claim 21, wherein said micro light modulator comprises at least one further set of microlenses.

23. Micro light modulator arrangement according to claim 22, wherein said at least one further set of microlenses are arranged as at least one separate layer.

24. Micro light modulator arrangement according to claim 1 wherein said translucent substrate comprises fused silica.

25. Micro light modulator arrangement according to claim 1 wherein said translucent substrate comprises glass.

26. Micro light modulator arrangement according to claim 15, wherein said translucent substrate comprises polymers.

27. Micro light modulator arrangement according to claim 1, wherein said micro light modulator arrangement comprises said at least one blade movable between said at least two positions via said at least one movement path, and
electrode means for activating movement of said at least one blade between said at least two positions and for positioning the at least one blade in one of said at least two positions,
said electrode means being arranged out of reach of the at least one blade when the blade moves along said at least one movement path.

28. Micro light modulator arrangement according to claim 27, wherein a connection portion comprises at least one beam,
wherein said at least one blade is established on a microshutter platform comprising a translucent substrate, such as a glass wafer.

29. Micro light modulator arrangement according to claim 27, wherein said at least two positions comprise at least one position in which the at least one blade defines a blocking of at least one electromagnetic light transmission path.

30. Micro light modulator arrangement according to claim 14, wherein said light-emitting means is adapted for emitting visible light.

31. Micro light modulator arrangement according to claim 1, wherein the micro light modulator arrangement comprises a plurality of light modulators.

32. Sealing arrangement comprising:
a micro light modulator, comprising at least one light transmission path and at least one controllable shutter arranged for modulation of light transmitted via said at least one light transmission path, at least a part of said light transmission path comprising a translucent modulator substrate, and said at least part of said light transmission path being an integral part of a substrate to which said at least one controllable shutter is anchored;

wherein said sealing comprises said at least a part of said light transmission path: and at least one blade movable between at least two positions via at least one movement path, wherein said blade is anchored on a micro shutter platform by anchoring means;

said at least one transmission path (TP) extending through said micro shutter platform via a solid translucent transmission path; and said at least one transmission path guiding electromagnetic light through said shutter platform which is at least partly defined by means of a masking.

33. Sealing arrangement according to claim 32, wherein said sealing further comprises at least one microlens arrangement.

34. Sealing arrangement according to claim 32, wherein said sealing encloses said at least one controllable shutter.

* * * * *

UNITED STATES PATENT AND TRADEMARK OFFICE
CERTIFICATE OF CORRECTION

| | | |
|---|---|---|
| PATENT NO. | : 7,227,677 B2 | Page 1 of 1 |
| APPLICATION NO. | : 10/509148 | |
| DATED | : June 5, 2007 | |
| INVENTOR(S) | : Ravnkilde et al. | |

It is certified that error appears in the above-identified patent and that said Letters Patent is hereby corrected as shown below:

Title Page, item (73) assignee, delete "DTCON" and insert therefor --DICON--

Signed and Sealed this

Twenty-third Day of October, 2007

JON W. DUDAS
*Director of the United States Patent and Trademark Office*